(12) United States Patent
Kanzaki

(10) Patent No.: US 11,962,740 B2
(45) Date of Patent: Apr. 16, 2024

(54) IMAGE PROCESSING DEVICE AND PRINTING APPARATUS DISPLAYING RANGE OF COLORS TARGETED FOR COLOR CALIBRATION SET FOR SPECIFIED COLOR

(71) Applicant: BROTHER KOGYO KABUSHIKI KAISHA, Nagoya (JP)

(72) Inventor: Takashi Kanzaki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/354,811

(22) Filed: Jul. 19, 2023

(65) Prior Publication Data
US 2024/0031508 A1 Jan. 25, 2024

(30) Foreign Application Priority Data
Jul. 20, 2022 (JP) .................................. 2022-115218

(51) Int. Cl.
*H04N 1/60* (2006.01)

(52) U.S. Cl.
CPC ................................ *H04N 1/6019* (2013.01)

(58) Field of Classification Search
CPC .... G01J 3/46; G01J 3/462; G01J 3/465; G01J 3/51; G06F 15/00; H04N 1/54; H04N 1/6058; H04N 1/6061; H04N 9/64; G09G 2320/0606; G09G 2320/0666; G09G 5/06; G02B 5/201; G02B 5/223; G02B 5/226; G02B 5/285; G02C 7/102; G02C 7/104; G02C 7/107; G02C 7/12

USPC .......................................................... 358/518
See application file for complete search history.

(56) References Cited

U.S. PATENT DOCUMENTS

| 7,492,478 | B2* | 2/2009 | Une | H04N 1/603 |
| | | | | 358/1.9 |
| 7,595,910 | B2* | 9/2009 | Mahy | H04N 1/6052 |
| | | | | 358/406 |
| 9,948,830 | B2* | 4/2018 | Inamura | H04N 1/6016 |
| 10,453,171 | B2* | 10/2019 | Chen | G06F 12/0207 |
| 10,861,412 | B2* | 12/2020 | Fukasawa | H04N 1/603 |

(Continued)

FOREIGN PATENT DOCUMENTS

| JP | 2010-157920 A | 7/2010 |
| JP | 2011-130422 A | 6/2011 |

*Primary Examiner* — Negussie Worku
(74) *Attorney, Agent, or Firm* — Scully, Scott, Murphy & Presser, PC

(57) ABSTRACT

In an image processing device a controller is configured to perform: a first display operation; and a second display operation to display at least one of a target color and a non-target color in a manner different from the at least one of the target color and the non-target color in a printing target image displayed by the first display operation. The target color is a color targeted for color calibration and included in a color calibration space. The color calibration space is defined by a predetermined number of first grid points and a plurality of second grid points. The first grid points define a first polyhedron with a minimum volume enclosing the specified color. The second grid points define a plurality of second polyhedra with the minimum volume together with the first grid points. The color calibration space is a space enclosed by the second grid points.

10 Claims, 10 Drawing Sheets

(56) References Cited

U.S. PATENT DOCUMENTS

| | | | |
|---|---|---|---|
| 10,957,239 B2* | 3/2021 | Greenebaum | G09G 3/2051 |
| 11,024,255 B2* | 6/2021 | Marcu | G09G 5/02 |
| 2006/0192996 A1* | 8/2006 | Yamamoto | G06F 3/1205 |
| | | | 358/1.15 |
| 2009/0103121 A1* | 4/2009 | Horita | H04N 1/6011 |
| | | | 358/1.9 |
| 2015/0278661 A1* | 10/2015 | Hasegawa | H04N 1/00 |
| | | | 358/1.9 |

* cited by examiner

FIG. 1
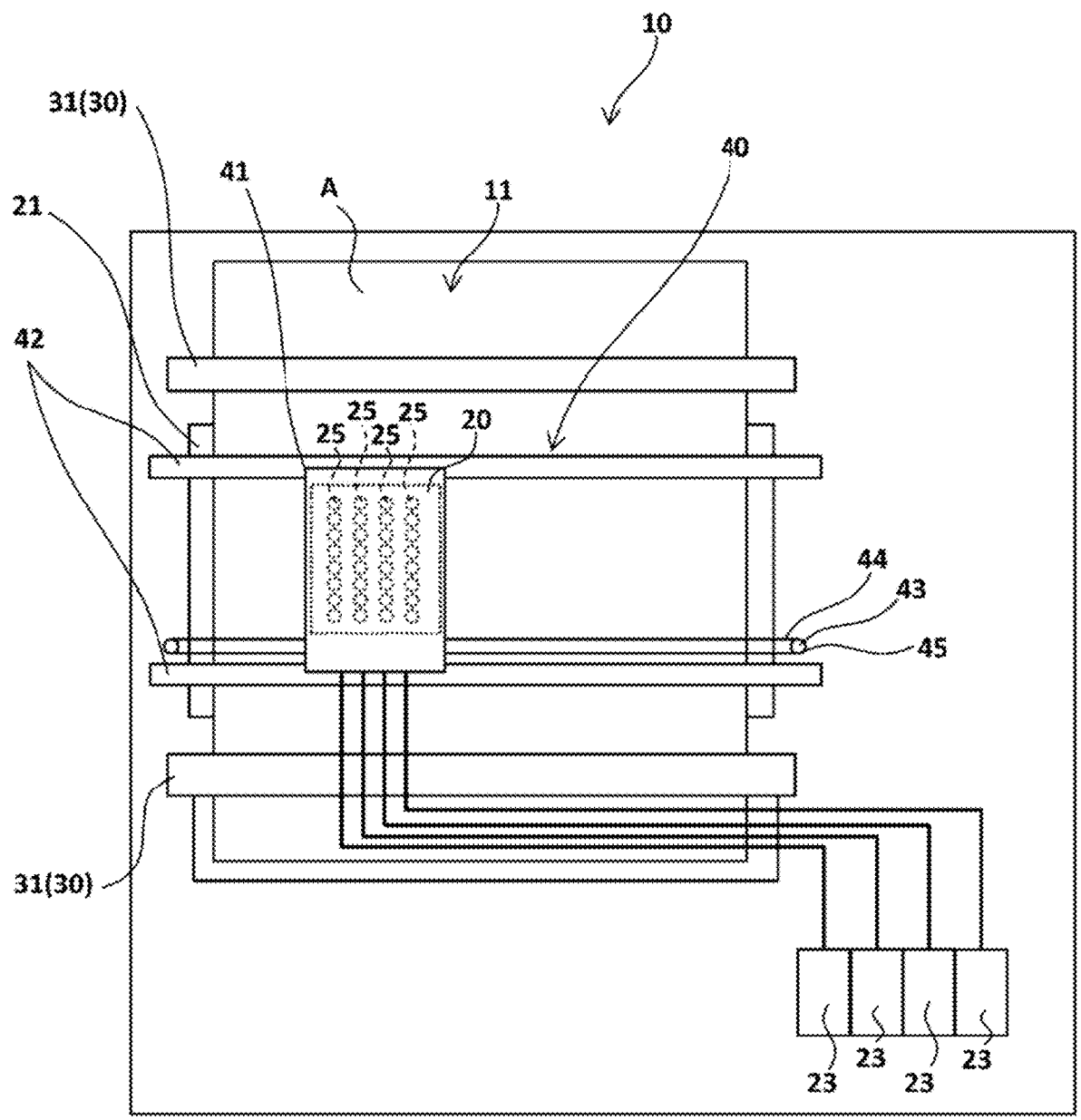
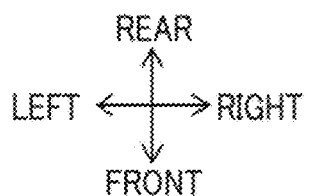

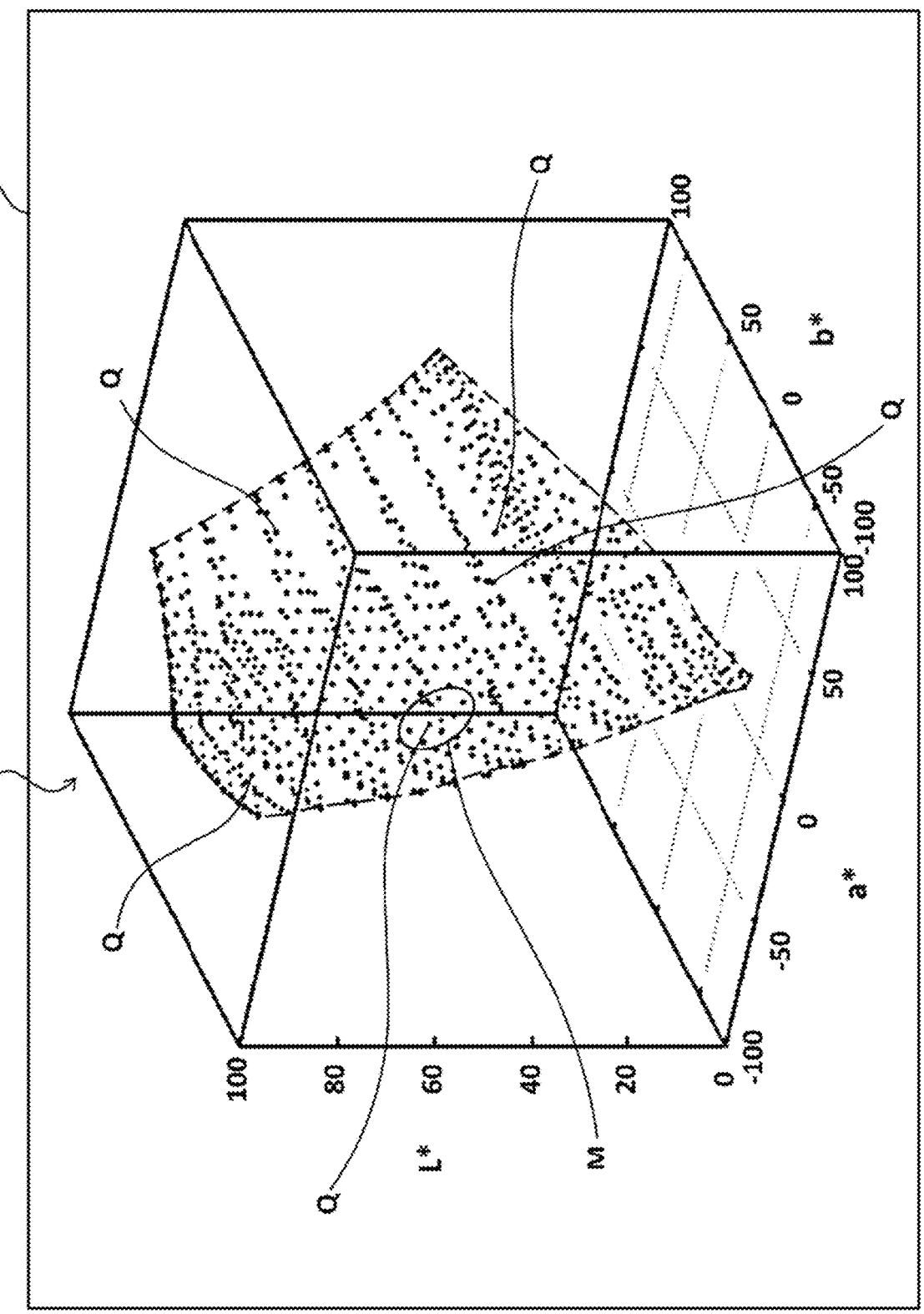

IMAGE PROCESSING DEVICE AND PRINTING APPARATUS DISPLAYING RANGE OF COLORS TARGETED FOR COLOR CALIBRATION SET FOR SPECIFIED COLOR

REFERENCE TO RELATED APPLICATIONS

This application claims priority from Japanese Patent Application No. 2022-115218 filed on Jul. 20, 2022. The entire content of the priority application is incorporated herein by reference.

BACKGROUND ART

The information processing device described in Japanese Patent Application Publication No. 2010-157920 is one example of a conventional image processing device. This information processing device extracts a color that an operator has specified in data to be printed and controls a printer to print an image of a color patch for calibration (hereinafter also referred to as "calibration patch image") based on the specified color. Next, the information processing device measures the color of the calibration patch image printed by the printer and performs color calibration on the data being printed based on this colorimetric data.

DESCRIPTION

As described above, the conventional information processing device performs color calibration on the data being printed on the basis of a color specified by the operator. However, the range of colors to be calibrated on the basis of the specified color is difficult for the operator to identify.

In view of the foregoing, it is an object of the present disclosure to provide an image processing device, a method of controlling the image processing device, a non-transitory computer-readable storage medium storing a set of computer-readable instructions for controlling the image processing device and a printing apparatus that enable a user to easily identify the range of colors targeted for color calibration set for a specified color in a printing target image.

(1) In order to attain the above and other object, according to one aspect, the present disclosure provides an image processing device. The image processing device includes: a display; an input unit; a storage unit; and a controller. The display is configured to display a printing target image. The input unit is configured to input a specified color specified from among a plurality of image colors used in the printing target image displayed on the display. The storage unit is configured to store a conversion table mapping a plurality of input values to respective ones of a plurality of output values. The plurality of input values corresponds to respective ones of a plurality of grid points in a predetermined color space. The controller is configured to perform: a first display operation; and a second display operation. The first display operation is to display the printing target image on the display. The second display operation is performed in response to the input unit inputting the specified color in the printing target image displayed on the display in the first display operation. The second display operation is to display at least one of a target color and a non-target color in a manner different from the at least one of the target color and the non-target color in the printing target image displayed by the first display operation. The target color is a color targeted for color calibration and is included in a color calibration space in the predetermined color space. The non-targeted color is a color not targeted for the color calibration and is not included in the color calibration space. The color calibration space is defined by a predetermined number of first grid points and a plurality of second grid points. The first grid points are included in the plurality of grid points in the predetermined color space and define a first polyhedron. The first polyhedron is a polyhedron with a minimum volume enclosing the specified color and having the first grid points as vertices. The second grid points are included in the plurality of grid points in the predetermined color space and define a plurality of second polyhedra together with the first grid points. Each of the second polyhedra is a polyhedron with the minimum volume having a predetermined number of specific grid points as vertices. The predetermined number of specific grid points is included in the first grid points and the second grid points and includes at least one first grid point and at least one second grid point adjacent to one of the at least one grid point. No grid point is positioned between each of the at least one second grid point and the one of the at least one first grid point. The color calibration space is a space enclosed by the second grid points.

(2) According to another aspect, the present disclosure also provides a printing apparatus. The printing apparatus includes: the image processing device according to the aspect (1); and a printing engine. The printing engine is configured to print a patch chart on a print medium. The patch chart includes a first patch for a predetermined color and a second patch for the specified color. The patch chart has a first patch area and a second patch area. The first patch is arranged in the first patch area. The second patch is arranged in the second patch area. The controller is configured to further perform: a printing operation. The printing operation is to print the patch chart on the print medium with the printing engine.

(3) According to still another aspect, the present disclosure also provides a method of controlling an image processing device. The image processing device includes: a display; an input unit; and a storage unit. The display is configured to display a printing target image. The input unit is configured to input a specified color specified from among a plurality of image colors used in the printing target image displayed on the display. The storage unit is configured to store a conversion table mapping a plurality of input values to respective ones of a plurality of output values. The plurality of input values corresponds to respective ones of a plurality of grid points in a predetermined color space. The method includes: a first display operation; and a second display operation. The first display operation is to display the printing target image on the display. The second display operation is performed in response to the input unit inputting the specified color in the printing target image displayed on the display in the first display operation. The second display operation is to display at least one of a target color and a non-target color in a manner different from the at least one of the target color and the non-target color in the printing target image displayed by the first display operation. The target color is a color targeted for color calibration and is included in a color calibration space in the predetermined color space. The non-targeted color is a color not targeted for the color calibration and is not included in the color calibration space. The color calibration space is defined by a predetermined number of first grid points and a plurality of second grid points. The first grid points are included in the plurality of grid points in the predetermined color space and define a first polyhedron. The first polyhedron is a polyhedron with a minimum volume enclosing the specified color and having the first grid points as vertices. The second grid points are included in the plurality of grid points in the predetermined color space and define a plurality of second polyhedra together with the first grid points. Each of the second polyhedra is a polyhedron with the minimum volume having a predetermined number of specific grid points as vertices. The predetermined number of specific grid points are included in the first grid points and the second grid points and include at least one first grid point and at least one second grid point adjacent to one of the at least one first grid point. No grid point is positioned between each of the at least one second grid point and the one of the at least one first grid point. The color calibration space is a space enclosed by the second grid points.

(4) According to still another aspect, the present disclosure also provides a non-transitory computer-readable storage medium storing a set of computer-readable instructions for controlling an image processing device. The image processing device includes: a display; an input unit; and a storage unit. The display is configured to display a printing target image. The input unit is configured to input a specified color specified from among a plurality of image colors used in the printing target image displayed on the display. The storage unit is configured to store a conversion table mapping a plurality of input values to respective ones of a plurality of output values. The plurality of input values corresponds to respective ones of a plurality of grid points in a predetermined color space. The set of computer-readable instructions includes: a first display operation; and a second display operation. The first display operation is to display the printing target image on the display. The second display operation is performed in response to the input unit inputting the specified color in the printing target image displayed on the display in the first display operation. The second display operation is to display at least one of a target color and a non-target color in a manner different from the at least one of the target color and the non-target color in the printing target image displayed by the first display operation. The target color is a color targeted for color calibration and is included in a color calibration space in the predetermined color space. The non-targeted color is a color not targeted for the color calibration and is not included in the color calibration space. The color calibration space is defined by a predetermined number of first grid points and a plurality of second grid points. The first grid points are included in the plurality of grid points in the predetermined color space and define a first polyhedron. The first polyhedron is a polyhedron with a minimum volume enclosing the specified color and having the first grid points as vertices. The second grid points are included in the plurality of grid points in the predetermined color space and define a plurality of second polyhedra together with the first grid points. Each of the second polyhedra is a polyhedron with the minimum volume having a predetermined number of specific grid points as vertices. The predetermined number of specific grid points are included in the first grid points and the second grid points and include at least one first grid point and at least one second grid point adjacent to one of the at least one first grid point. No grid point is positioned between each of the at least one second grid point and the one of the at least one first grid point. The color calibration space is a space enclosed by the second grid points.

The above configurations can provide an image processing device, a method of controlling the image processing device, a non-transitory computer-readable storage medium storing a set of computer-readable instructions for controlling the image processing device, and a printing apparatus that enable a user to identify a range of colors targeted for color calibration set for a specified color in a printing target image.

The above objects, other objects, features, and advantages of the disclosure will become clear from the following detailed description of embodiments, with reference to the accompanying drawings.

FIG. 1 is a schematic plan view of a printing apparatus.

FIG. 6 is an explanatory diagram illustrating the display unit on which colors targeted for color calibration and color not targeted for color calibration are displayed on a color space image representing the predetermined color space in a manner in which the colors targeted for color calibration are distinguishable from the color not targeted for color calibration.

Hereinafter, specific embodiments of the present disclosure will be described while referring to the accompanying drawings. In the following description, the same or corresponding elements are designated with the same reference symbols throughout the drawings.

<Configuration of Printing Apparatus>

FIG. 1 illustrates an example of a printing apparatus 10 according to one embodiment of the present disclosure. The printing apparatus 10 prints images on print media A with colorant. An inkjet printer that performs printing with ink is applied as the printing apparatus 10 in the following description, but the printing apparatus 10 is not limited to this example. The printing apparatus 10 may be another type of printer, such as a laser printer or a thermal printer. In this case, the colorant is not limited to ink but may be toner or the like.

Figure 2:
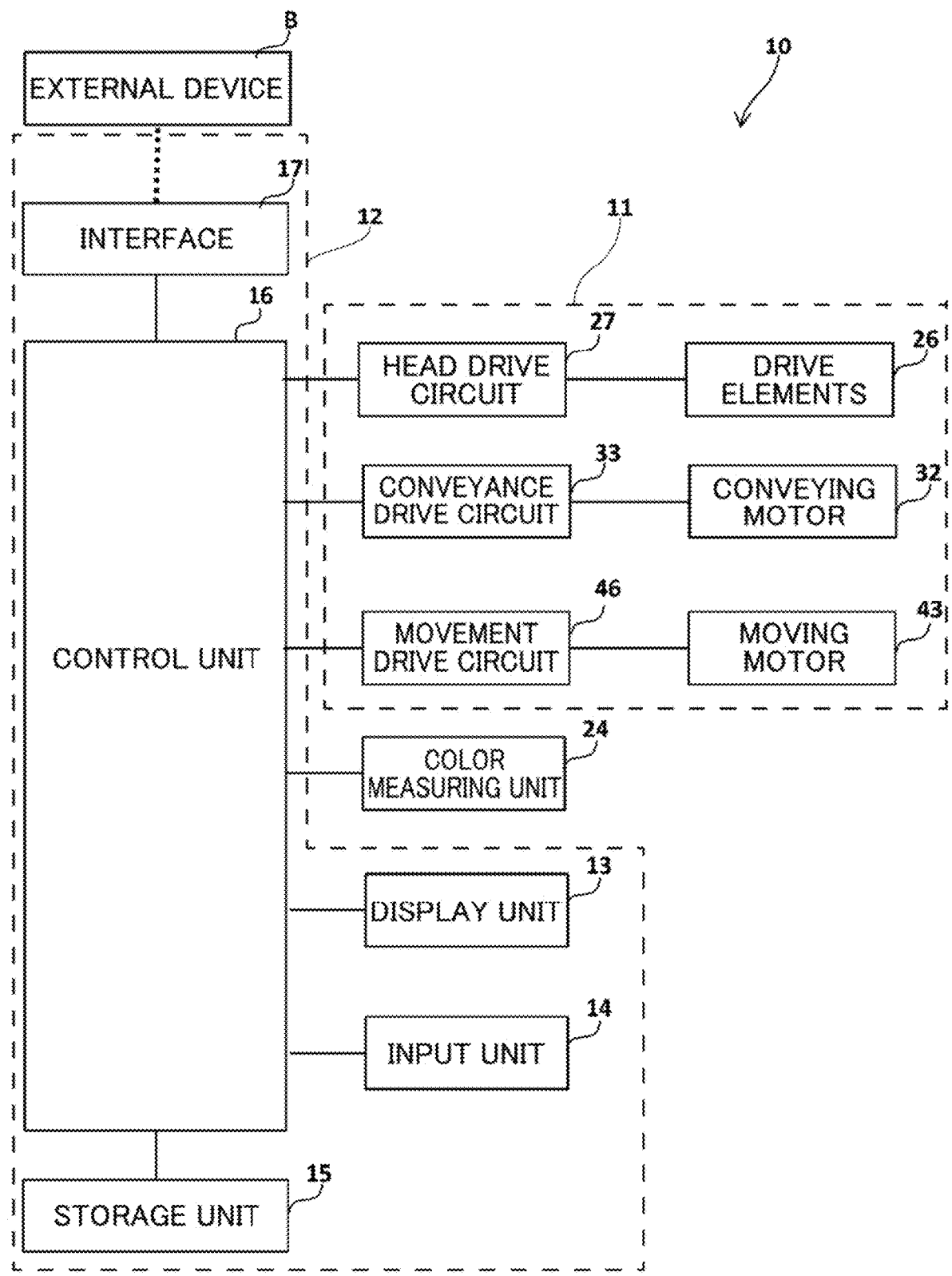
FIG. 2 is a block diagram illustrating the functional structure of the printing apparatus.

The printing apparatus 10 is provided with a printing engine 11, a color measuring unit 24 (see FIG. 2), and an image processing device 12 (see FIG. 2). The printing engine 11 is a serial printer that includes a print head 20, a platen 21, tanks 23, a conveying unit 30, and a moving unit 40. The direction in which the conveying unit 30 conveys the print medium A will be called the front-rear direction. Directions that cross (e.g., orthogonally) the front-rear direction and that cross (e.g., orthogonally) each other will be called the left-right direction and the up-down direction. However, the layout of the printing apparatus 10 is not limited to this example.

The print head 20 has a plurality of nozzles 25, and a plurality of drive elements 26 (see FIG. 2). The nozzles 25 are open in the bottom surface of the print head 20. The drive elements 26 may be piezoelectric elements, heating elements, electrostatic actuators, and the like. The drive elements 26 are provided for respective nozzles 25 in the print head 20 and apply pressure to eject ink from the nozzles 25. The platen 21 has a flat top surface and defines the distance between a print medium A placed on this top surface and the bottom surface of the print head 20 disposed in opposition to this top surface. The tanks 23 store ink to be ejected from the nozzles 25. The example in FIG. 1 shows four tanks 23 that respectively store cyan ink, yellow ink, magenta ink, and black ink. The tanks 23 are connected to the print head 20 via tubes and supply ink to corresponding nozzles 25 via the tubes.

The conveying unit 30 has two conveying rollers 31, and a conveying motor 32 (see FIG. 2), for example. The two conveying rollers 31 are arranged one on either side of the platen 21 in the front-rear direction. The conveying rollers 31 have axes extending in the left-right direction and are coupled to the conveying motor 32. When driven by the conveying motor 32, the conveying rollers 31 rotate about their axes and convey a print medium A in the front-rear direction over the platen 21.

The moving unit 40 has a carriage 41, two guide rails 42, a moving motor 43, and an endless belt 44. The carriage 41 supports the print head 20. The carriage 41 is supported on the two guide rails 42 to be capable of moving in the left-right direction. The two guide rails 42 extend in the left-right direction above the platen 21 with the print head 20 interposed therebetween in the front-rear direction. The endless belt 44 extends in the left-right direction and is attached to the carriage 41. The endless belt 44 is also attached to the moving motor 43 via a pulley 45. When the moving motor 43 is driven, the endless belt 44 circulates and the carriage 41 reciprocates along the guide rails 42 in the left-right direction. In this way, the carriage 41 moves the print head 20 in the left-right direction.

<Image Processing Device>

As illustrated in the example of FIG. 2, the printing apparatus 10 includes an image processing device 12 in addition to the printing engine 11 and the color measuring unit 24. The image processing device 12 is provided with a display unit 13, an input unit 14, a storage unit a control unit 16, and an interface 17. The control unit 16 is a computer that is electrically connected to the interface 17 and the storage unit 15. The interface 17 receives image data and various other data from an external device B, such as a computer, camera, communication network, storage medium, display, or printer and outputs this data to the control unit 16. The image data is raster data and the like representing an image, such as a printing target image C or a patch chart P described later. The control unit 16 may be configured as a standalone device, or a plurality of devices in a distributed arrangement. In the latter case, the devices interact with each other to operate components of the printing apparatus 10.

The storage unit 15 is memory that the control unit 16 can access. The storage unit has RAM and ROM. The RAM temporarily stores various data including image data and data converted by the control unit 16. The ROM stores programs for performing various data processes, a conversion table that maps input values to output values, and the like. The programs may also be stored in an external storage medium, such as a CD-ROM, that differs from the storage unit 15 but is accessible by the control unit 16.

The control unit 16 includes a CPU or other processor, as well as an ASIC or other integrated circuit, for example. By executing the programs, the control unit 16 controls the components of the printing apparatus 10 to implement various operations including printing operations and display operations. These operations will be described later in detail.

The control unit 16 is electrically connected to the display unit 13, input unit 14, and color measuring unit 24. The display unit 13 is a display, for example, and displays a printing target image C or other images under the control of the control unit 16. The input unit 14 is a device that the user operates to input information into the control unit 16. For example, the user may specify a color in a printing target image C displayed on the display unit 13 to input a specified color D into the control unit 16. Examples of the input unit 14 are keys or buttons, a mouse, and a touchscreen integrated with the display unit 13. The interface 17 that receives information from the external device B may also function as the input unit. The color measuring unit 24 is a spectrophotometer, for example, that measures colors in a patch chart P and inputs the measured colors into the control unit 16.

The control unit 16 is also electrically connected to the conveying motor 32 of the conveying device 30 via a conveyance drive circuit 33 for controlling the drive of the conveying motor 32. Accordingly, the control unit 16 controls conveyance of print media A with the conveying device 30. The control unit 16 is also electrically connected to the moving motor 43 of the moving unit 40 via a movement drive circuit 46 for controlling the drive of the moving motor 43. Accordingly, the control unit 16 controls movement of the print head 20 with the moving unit 40.

The control unit 16 is also electrically connected to the drive elements 26 of the print head 20 via a head drive circuit 27. The control unit 16 outputs control signals for the drive elements 26 to the head drive circuit 27, and the head drive circuit 27 generates and outputs drive signals to the drive elements 26 on the basis of these control signals. When driven according to the drive signals, the drive elements 26 eject ink from corresponding nozzles 25.

<Printing Operation>

With the printing apparatus 10 having the above configuration, the control unit 16 acquires image data representing an image such as a printing target image C or a patch chart P and performs a printing operation based on this image data. At this time, the control unit 16 ejects ink from the print head 20 onto a print medium A while moving the print head 20 leftward or rightward, for example. Next, the control unit 16 conveys the print medium A forward. By repeatedly alternating between an operation to move the print head 20 and eject ink and an operation to convey the print medium A in this way, the printing apparatus 10 carries out a printing operation to print an image on the print medium A with ink. As a result, the printing engine 11 prints an image such as the patch chart P.

<Conversion Table>

To perform a printing operation, the control unit 16 uses a conversion table to convert image data representing an image such as a printing target image C of a patch chart P to a format for printing the image on the printing apparatus 10, for example. Next, the control unit 16 performs a printing operation using the printing engine 11 on the basis of the image data converted with the conversion table.

This conversion table is a look-up table that maps input values to output values, for example. The conversion table is stored in the storage unit 15 in advance. The input values are expressed as color values in a predetermined color space, such as RGB values in the RGB color space. The output values are expressed as color values in a predetermined color space for colors that the printing apparatus 10 can print using the colorant provided in the printing apparatus 10, such as CMYK values in the CMYK color space. The output values may also be expressed by RGB values in the RGB color space.

The RGB values as the input values in the conversion table are representative values in the color range from RGB values (0, 0, 0) through RGB values (255, 255, 255), for example. These representative values are the color values found by dividing a color gamut of 256 gradations at intervals of 16 gradations for each of the RGB values, for example. In this case, the representative values include $(256/16+1)^3=4913$ colors.

The conversion table may include a first conversion table for converting RGB values to color values in a profile connection space (PCS), i.e., PCS color values, and a second conversion table for converting the PCS color values to CMYK values. The PCS color values are color coordinates in a device-independent color space, such as Lab values in the L*a*b* color space. In this case, the RGB values, which are the input values, are first converted to Lab values, which are the PCS color values, using the first conversion table, and the Lab values are then converted to CMYK values, which are the output values, using the second conversion table.

<First Display Operation>

Prior to printing a printing target image C with the printing apparatus 10, the control unit 16 calibrates colors in the conversion table on the basis of a specified color D, which is a color specified by the user. The control unit 16 performs a first display operation in order to specify the specified color D in the printing target image C.

Figure 3:
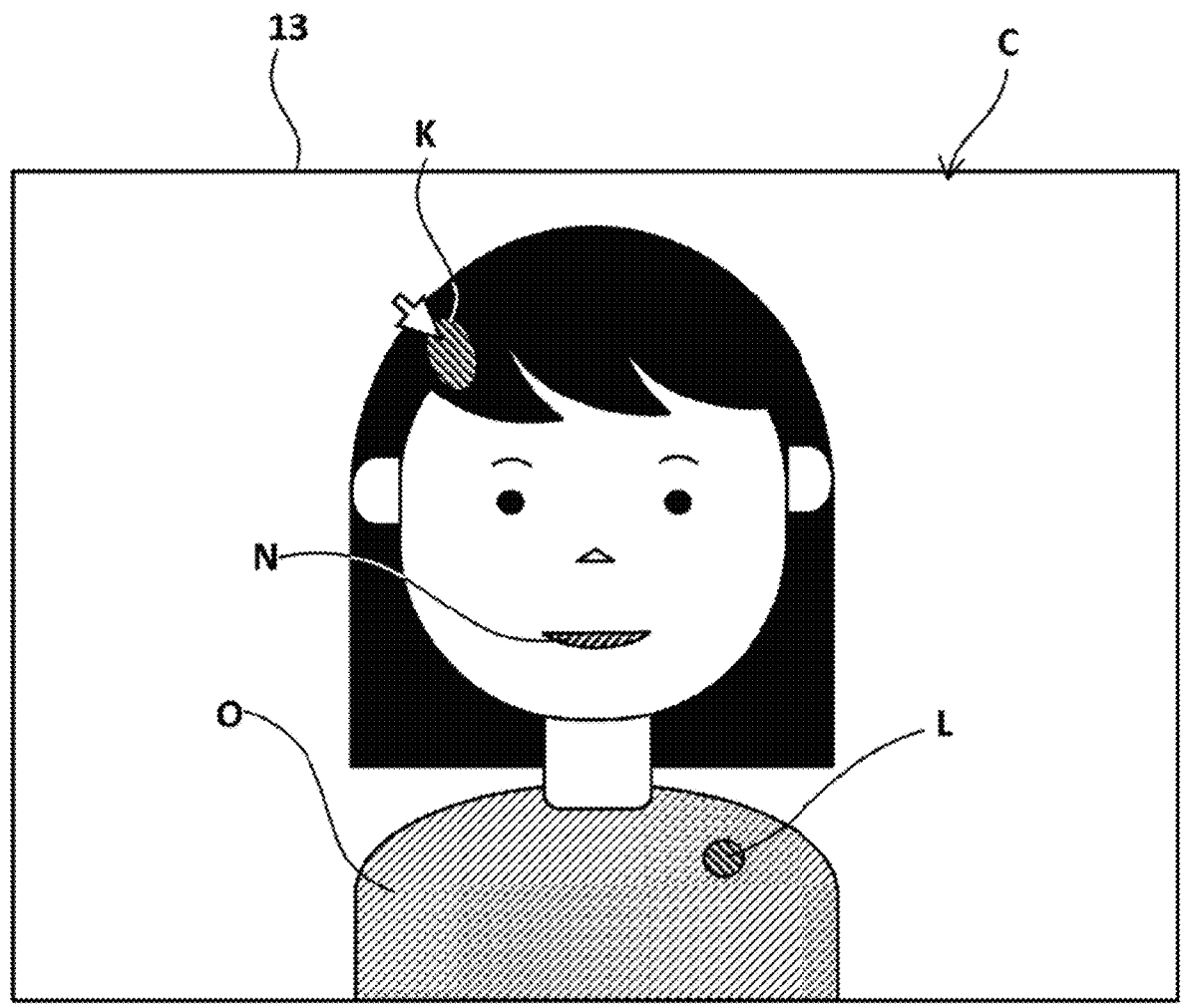
FIG. 3 is an explanatory diagram illustrating a display unit on which a printing target image is displayed.

Specifically, the control unit 16 performs the first display operation to display the printing target image C on the display unit 13 on the basis of image data therefor, as illustrated in the example of FIG. 3. At this time, the user specifies a color in the printing target image C displayed on the display unit 13, which is indicated by a pointer in the example of FIG. 3. In other words, the color is indicated by the position of the pointer. In this example, the user has specified a blue color in a hair clip K. The control unit 16 identifies the pixel corresponding to the position specified through the input unit 14 from among the plurality of pixels in the printing target image C, acquires the color of this pixel (a blue color in this example) on the basis of the image data for the printing target image C as the specified color D, and stores the specified color D in the storage unit 15 (e.g., RAM). Here, to acquire or store the color of a specific pixel means, for example, to acquire or store the color value of that pixel.

<Second Display Operation>

As described above, the control unit 16 calibrates colors in the conversion table on the basis of the specified color D specified by the user in the printing target image C displayed in the first display operation. The control unit 16 performs a second display operation so that the user can easily identify the range of colors to be calibrated on the basis of the specified color D in this printing target image C.

When the user operates the input unit 14 to input a specified color D in the printing target image C displayed in the first display operation, the control unit 16 performs the second display operation to display colors in the printing target image C on the display unit 13 in a manner different from the first display operation. Colors in the printing target image C are either colors targeted for color calibration (hereinafter also referred to as "target colors for color calibration" or simply "target colors"), which are colors included in a color calibration space E described later, or colors not targeted for color calibration (hereinafter also referred to as "non-target colors for color calibration" or simply "non-target colors"), which are colors not included in the color calibration space E. Thus, in the second display operation the control unit 16 displays target colors that fall in the color calibration space E on the display unit 13 in a manner that can be distinguished from non-target colors outside of the color calibration space E.

The color calibration space E is determined as follows. In a predetermined color space having a plurality of grid points corresponding to the input values of the conversion table, a polyhedron with the minimum volume that has a predetermined number of these grid points as vertices and that encloses the specified color D will be called a first polyhedron G, and the predetermined number of grid points defining the first polyhedron G will be called first grid points H. In other words, the first polyhedron G has the first grid points H as vertices. In addition, a predetermined number of these grid points that are adjacent to at least one of the first grid points H and that define a plurality of polyhedra with the minimum volume together with the first grid points H will be called second grid points J, and each of the polyhedra having a predetermined number of specific grid points selected from among the first grid points H and second grid points J as vertices will be called a second polyhedron I. The specific grid points for one second polyhedron I includes at least one first grid point H and second grid points J adjacent to the at least one first grid point H. The space enclosed by the second grid points J constitutes the color calibration space E. In other words, the color calibration space E is defined by the first grid points H and the second grid points J, and is a space occupied by the first polyhedron G and second polyhedra I.

Figure 4A:
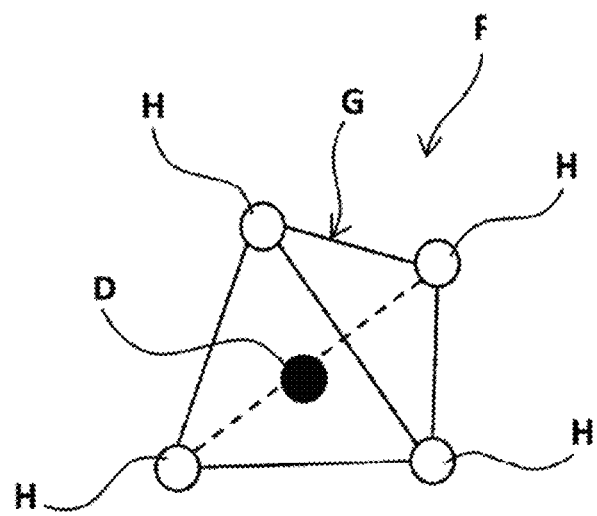
FIG. 4A is an explanatory diagram illustrating a specified color, first grid points and a first polyhedron in a predetermined color space.

Specifically, the control unit 16 acquires the input values in the conversion table stored in the storage unit 15, which are RGB values in this example. As illustrated in FIG. 4A, the control unit 16 acquires an RGB color space F, which is the predetermined color space having these input values as grid points. Note that FIG. 4A shows only some of the grid points in the RGB color space F. Here, to acquire or store a color space means, for example, to acquire or store a range of color values in the color space, and also to acquire or store a range of corresponding grid points.

Next, the control unit 16 acquires the specified color D from the storage unit 15 and arranges the specified color D in the RGB color space F. From the grid points in the RGB color space F, the control unit 16 acquires first grid points H corresponding to the vertices of the first polyhedron G enclosing the specified color D and stores the RGB values for these first grid points H in the storage unit 15. The first polyhedron G is a polyhedron with the minimum volume having a prescribed number (e.g., four) of grid points as vertices. For example, the first polyhedron G may be a triangular pyramid or a regular tetrahedron. Therefore, the first grid points H are the four grid points that are closest to the specified color D in the RGB color space F.

Figure 4B:
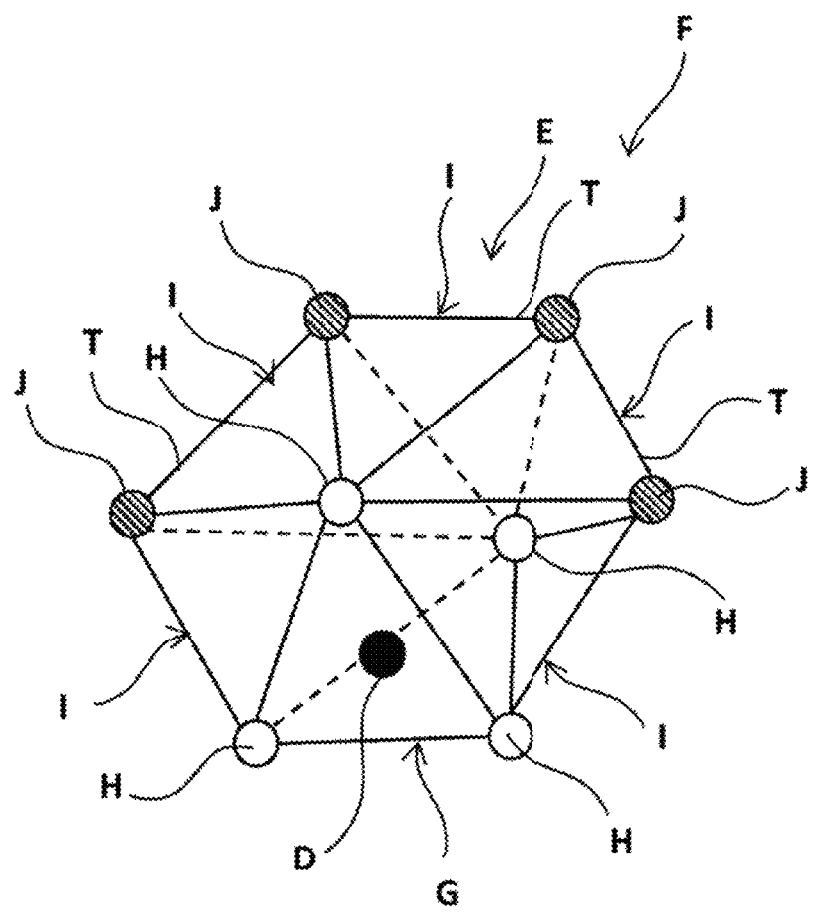
FIG. 4B is an explanatory diagram illustrating the specified color, the first grid points, the first polyhedron, second grid points and second polyhedra in the predetermined color space.

Next, for each of the four first grid points H, the control unit 16 acquires second grid points J in the RGB color space F that are grid points adjacent to the first grid point H and that, together with the first grid point H, forms vertices of a second polyhedron I, as illustrated in the example of FIG. 4B. No grid point is positioned between the first grid point H and each of the second grid points J adjacent to the first grid point H. The control unit 16 stores the RGB values for these grid points J in the storage unit 15. Note that FIG. 4B shows only some of the grid points in the RGB color space F.

Each second polyhedron I is a polyhedron with the minimum volume that has a prescribed number (e.g., four) of grid points (specific grid points) as vertices. For example, each second polyhedron I is a triangular pyramid or a regular tetrahedron. The second polyhedron I shares at least one vertex with the first polyhedron G. A plurality of second polyhedra I surround one first polyhedron G. The four vertices of each second polyhedron I are configured of at least one first grid point H and at least one second grid point J. At least one of the vertices of one second polyhedron I is a first grid point H while the remaining vertices are second grid points J.

More specifically, the first polyhedron G has four surfaces, each of which has three first grid points H as vertices. Three first grid points H of each surface constitutes one second polyhedron I together with one grid point close to these three first grid points H, which is a second grid point J. The first polyhedron G has four second polyhedra I adjacent to the first polyhedron G. Each of these four second polyhedra I has one second grid point J. Thus, the second grid points J are four grid points adjacent to or near the first grid points H.

In this way, the control unit 16 acquires four first grid points H and a plurality of second grid points J for a single specified color D. As a result, the control unit 16 obtains one first polyhedron G and a plurality of second polyhedra I for one specified color D. The control unit 16 stores the space enclosed by the plurality of second grid points J in the RGB color space F in the storage unit 15 as the color calibration space E. The color calibration space E is configured of the first polyhedron G and the second polyhedra I. In this example, the color calibration space E does not include the colors of the second grid points J and the colors on line segments T connecting adjacent second grid points J.

The control unit 16 acquires image colors Q based on the image data representing the printing target image C. The image colors Q are the colors used in the printing target image C. The control unit 16 determines that image colors Q included in the color calibration space E are target colors for color calibration and that image colors Q not included in the color calibration space E are non-target colors for color calibration. Next, the control unit 16 stores the target colors for color calibration in the storage unit 15 and displays these target colors on the display unit 13 in a manner distinguishable from the non-target colors. Note that the control unit 16 may also store the non-target colors in the storage unit 15 in addition to the target colors.

Figure 5A:
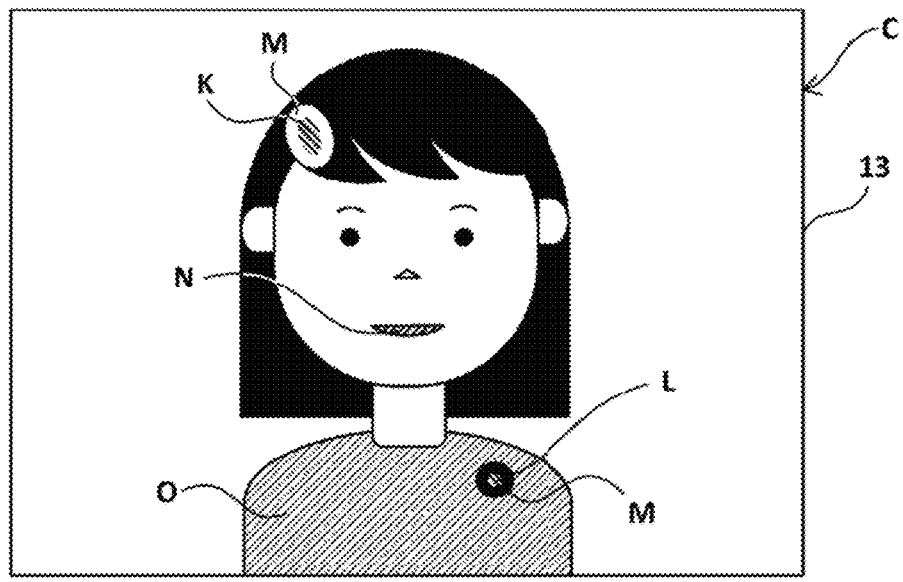
FIG. 5A is an explanatory diagram illustrating the display unit on which the printing target image is displayed so that colors targeted for color calibration set on the basis of a blue specified color are distinguishable from colors not targeted for color calibration in the printing target image.

In the second display operation, the control unit 16 displays either the target colors for color calibration or the non-target colors for color calibration in the printing target image C displayed on the display unit 13 in a manner different from the manner in which the target colors or the non-target colors are displayed in the first display operation. Accordingly, the target colors for color calibration are displayed in a manner distinguishable from the non-target colors for color calibration. That is, the control unit 16 displays the printing target image C on the display unit 13 and further displays borders M around areas of the printing target image C having the target colors for color calibration, as illustrated in the example of FIG. 5A. In this way, the target colors for color calibration in the printing target image C are displayed in a different manner from a manner in which the target colors for color calibration is displayed in the first display operation by surrounding the target colors with borders M. However, non-target colors in the printing target image C are displayed outside the borders M in the same manner as the manner in which the non-target colors are displayed in the first display operation. Therefore, a user can easily distinguish that colors of the printing target image C inside borders M are target colors for color calibration while colors outside borders M are non-target colors for color calibration.

In the example of FIG. 3, the user has used the input unit 14 to specify the blue color of the hair clip K, and this blue color has been inputted into the control unit 16 as the specified color D. The blue specified color D is included in the color calibration space E in the example of FIG. 4B. Image colors Q in the printing target image C that are close to the blue specified color D are considered approximate colors and are also included in the color calibration space E. In the example of FIG. 5A, the blue color and approximate colors to the blue color are used in the hair clip K and a brooch L. In this case, the colors of the brooch L, which has colors identical to the specified color D and the approximate colors, are set as target colors for color calibration in addition to the color of the hair clip K specified with the input unit 14. Accordingly, areas of the target colors in the hair clip K and brooch L are enclosed by borders M so that they appear differently from their display in the first display operation. In contrast, the areas of non-target colors for color calibration are displayed outside the borders M in the same manner they are displayed in the first display operation. In this way, the target colors are displayed on the display unit 13 in a manner distinguishable from the non-target colors outside the borders M.

<Third Display Operation>

The control unit 16 may also perform a third display operation for enabling the user to easily identify the range of colors targeted for color calibration set for the specified color D in the printing target image C. In the third display operation, the control unit 16 displays a color space image R representing a color space on the display unit 13, and within the color space image R, the control unit 16 displays the target colors for color calibration in a manner distinguishable from the non-target colors for color calibration. In the example of FIG. 6, the control unit 16 converts the RGB values representing the image colors Q in the printing target image C to Lab values using a first conversion table. Next, the control unit 16 displays the Lab values for all image colors Q in the L*a*b* color space displayed on the display unit 13 as the color space image R. The control unit 16 also displays a border M on the display unit 13 surrounding the area of image colors Q constituting target colors for color calibration. This enables the user to easily identify colors inside borders M in the color space image R as target colors for color calibration and colors outside borders M as non-target colors for color calibration.

Using the example in FIG. 3, when the user has used the input unit 14 to specify the blue color of the hair clip K as the specified color D, this specified color D and its approximate colors are included in the color calibration space E as target colors for color calibration. Therefore, in the color space image R representing the L*a*b* color space, the area of Lab values including the blue specified color D and its approximate colors is surrounded by a border M, as illustrated in the example of FIG. 6, thereby displaying the target colors for color calibration on the display unit 13 to be distinguishable from the non-target colors for color calibration.

<Patch Chart>

Figure 7:
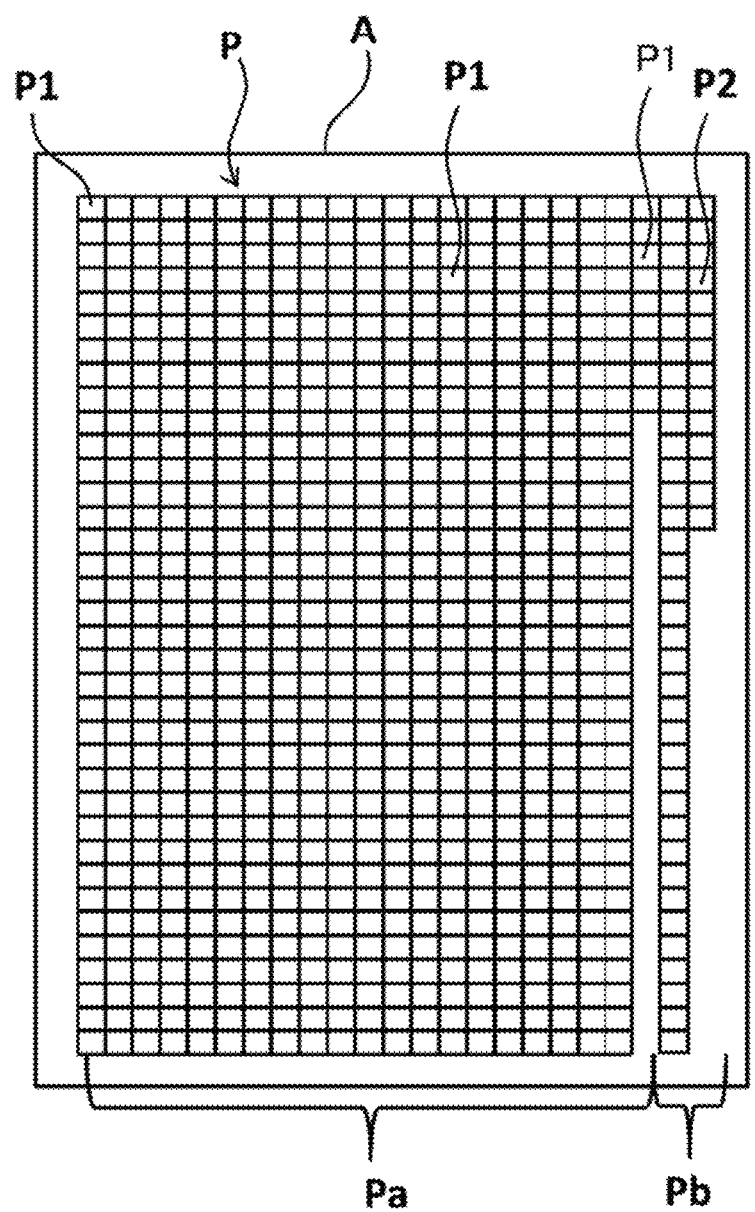
FIG. 7 is a plan view of a print medium on which a patch chart is printed.

As illustrated in the example of FIG. 7, a patch chart P for calibrating the conversion table has a plurality of patches. These patches include first patches P1 for predetermined first colors, and second patches P2 for second colors based on the specified color D.

The first colors of the first patches P1 are expressed in RGB values, for example, and stored in the storage unit 15 in advance. The first colors are colors included in the input values of the conversion table. The number of first colors is smaller than the number of input values in the conversion table. For example, the first colors are the color values obtained by dividing a color gamut with 256 gradations for each of the RGB values at intervals of 32 gradations, and in this case, the first colors include $(256/32+1)^3=729$ different colors.

The second colors of the second patches P2 include the first grid points H constituting the vertices of the first polyhedron G that encloses the specified color D. In addition to the first grid points H, the second colors may also include the specified color D. The first grid points H and the specified color D are expressed in RGB values, for example, and stored in the storage unit 15.

The patch chart P may be divided into two areas, such as a first patch area Pa in which the first patches P1 are arranged, and a second patch area Pb in which the second patches P2 are arranged. In this case, the first patch area Pa and second patch area Pb may each be a single closed area and the first patch area Pa and second patch area Pb may be arranged side by side in the left-right direction or the front-rear direction.

The patch chart P is printed on a single sheet or a plurality of sheets of print media A depending on the number of patches. When the number of patches is few, both the first patch area Pa and second patch area Pb may fit on a single print medium A, as in the example of FIG. 7. When the number of patches is great, the patch chart P may extend across a plurality of print media A, and the first patch area Pa and second patch area Pb are each arranged on at least one of the print media A.

<Method of Controlling the Printing Apparatus>

Figure 8:
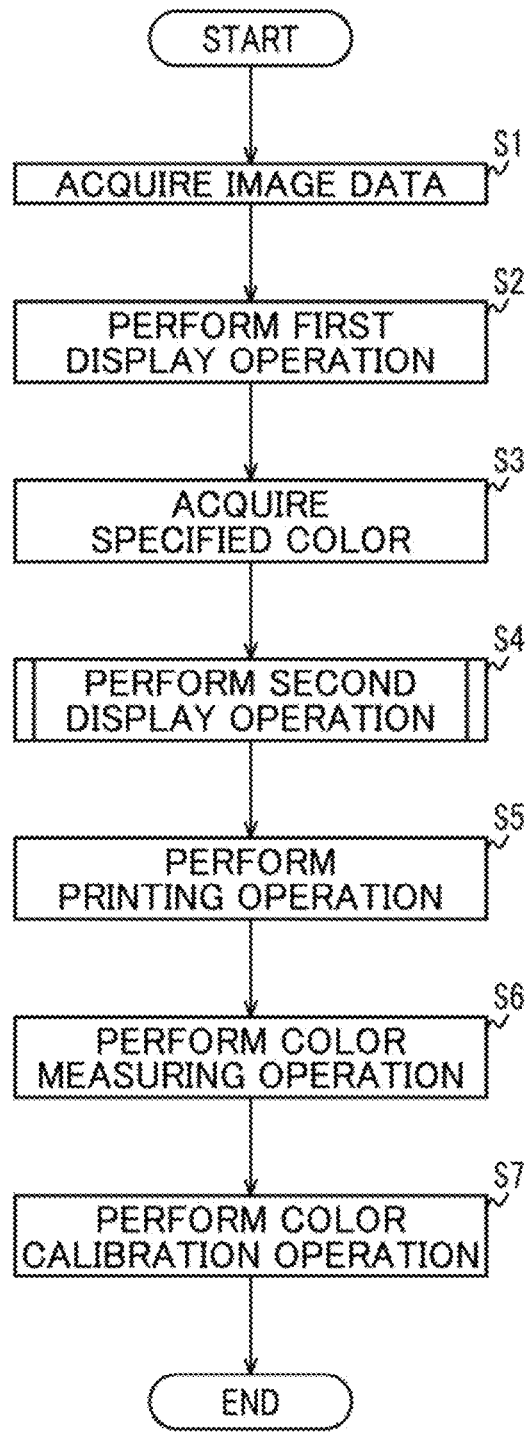
FIG. 8 is a flowchart illustrating steps in an example of a method of controlling the printing apparatus that is executed by a control unit.

FIG. 8 is a flowchart illustrating steps in an example of a method of controlling the printing apparatus 10 that is executed by the control unit 16. The printing apparatus 10 executes the steps according to this flowchart when image data representing a printing target image C is inputted into the interface 17 from the external device B, for example. In S1 at the beginning of the process, the control unit 16 acquires the image data representing the printing target image C from the external device B.

In S2 the control unit 16 performs the first display operation. In this operation, the control unit 16 acquires the colors of the printing target image C on the basis of the image data and displays the printing target image C on the display unit 13. The control unit 16 stores each display position on the display unit 13 in the storage unit 15 in association with the color of the printing target image C displayed at that position.

At this time, the user operates the input unit 14 to specify a color in the printing target image C displayed on the display unit 13. In S3 the control unit 16 acquires the color in the printing target image C corresponding to the position on the display unit 13 specified by the user and stores this color in the storage unit 15 as the specified color D.

Figure 9:
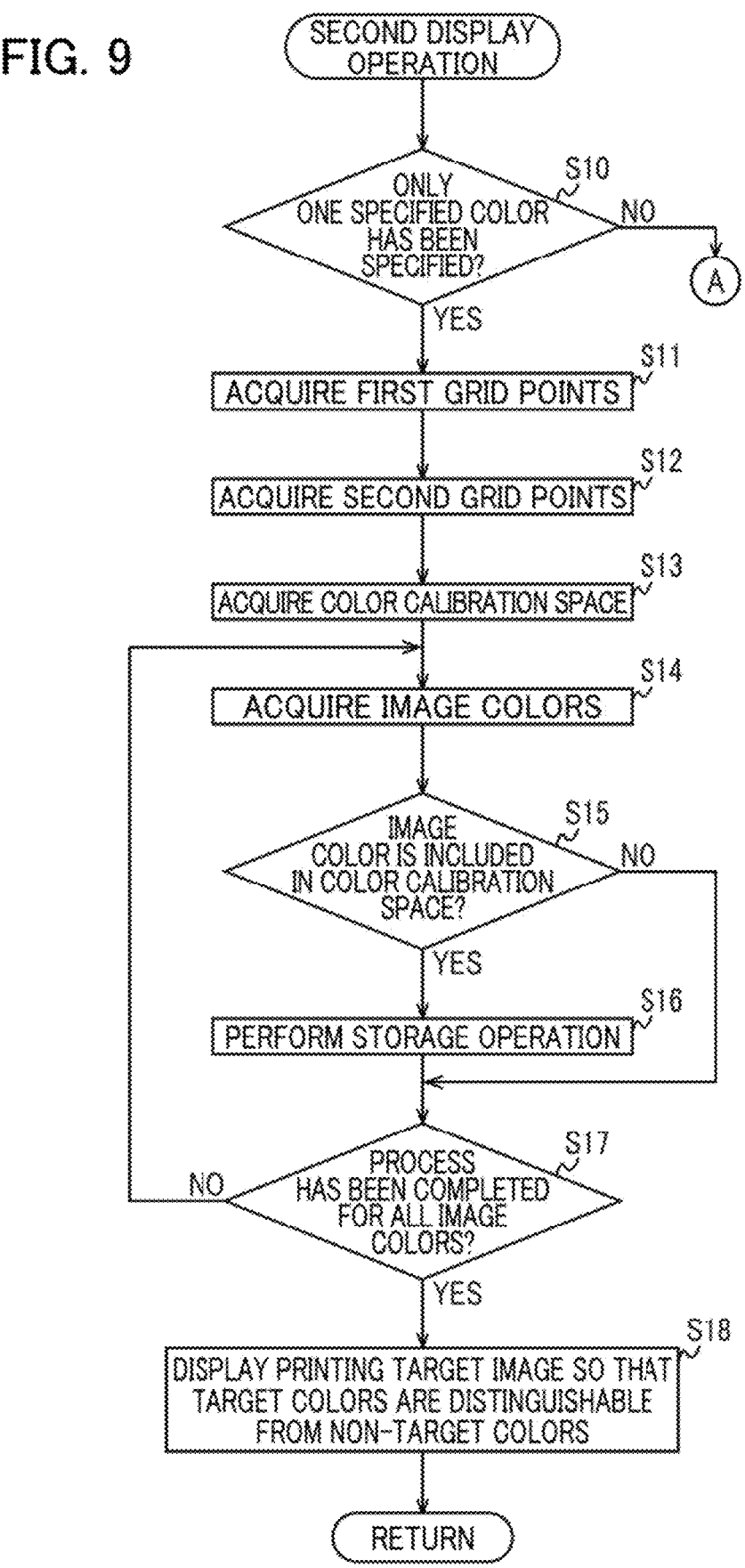
FIG. 9 is a flowchart illustrating a part of steps in an example of a second display operation executed by the control unit.
Figure 10:
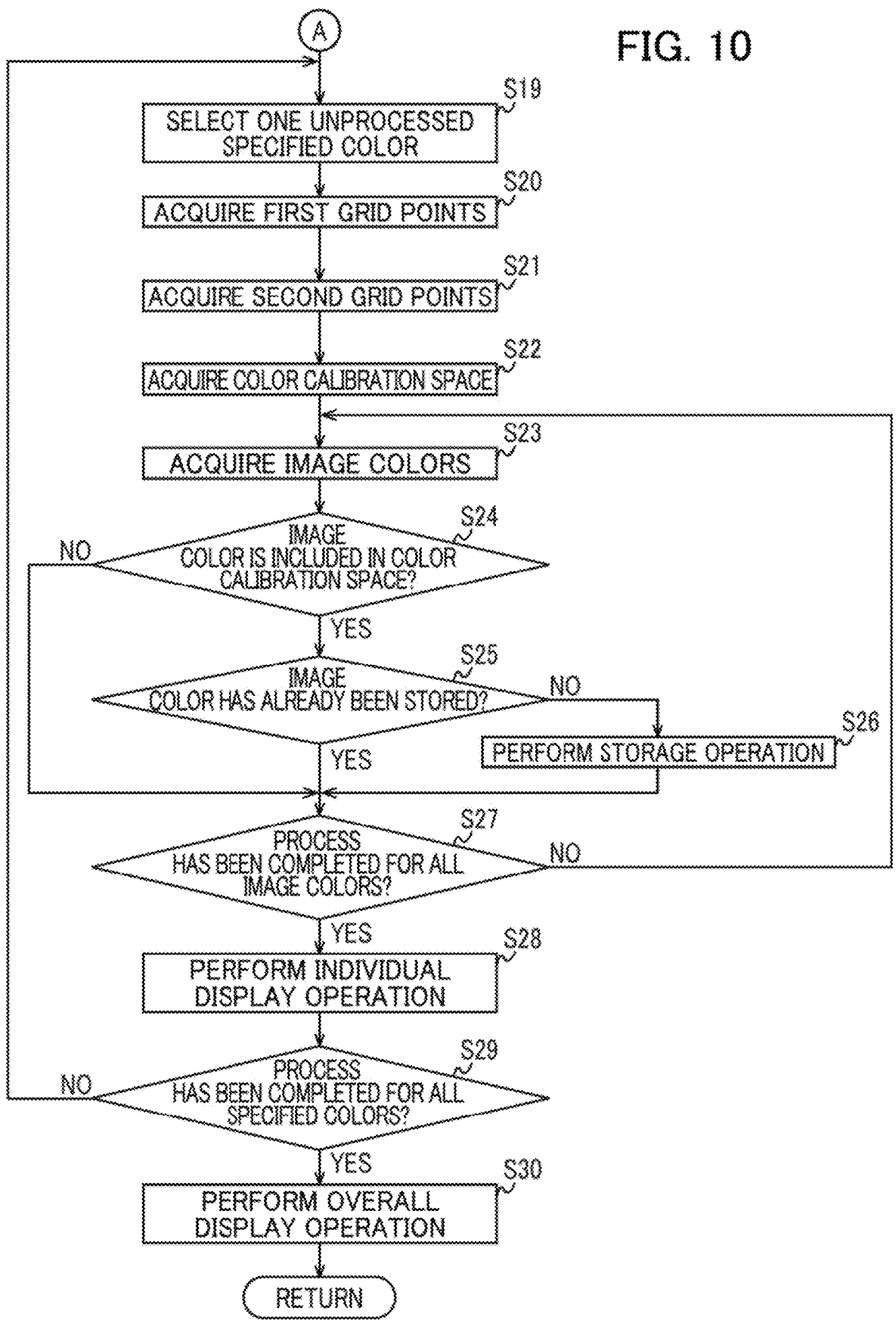
FIG. 10 is a flowchart illustrating the remaining part of steps in the example of the second display operation executed by the control unit.

In S4 the control unit 16 performs the second display operation. FIGS. 9 and 10 are flowcharts illustrating steps in an example of the second display operation executed by the control unit 16. In S10 at the beginning of the second display operation, the control unit 16 determines whether only one specified color D has been inputted via the input unit 14. When a plurality of specified colors D has been specified (S10: NO), the control unit 16 performs the process beginning from S19 of FIG. 10 described later. However, when only one specified color D has been specified (S10: YES), the control unit 16 continues the process from S11 in FIG. 9 on this specified color D.

The control unit 16 locates the specified color D in a predetermined color space, such as the RGB color space F, formed by grid points corresponding to the input values in the conversion table. In S11 the control unit 16 identifies the plurality of vertices of a first polyhedron G that encompasses the specified color D and acquires the plurality of grid points corresponding to these vertices as first grid points H.

In S12 the control unit 16 acquires grid points in the RGB color space F that configure the vertices of second polyhedra I together with the first grid points H as second grid points J. In S13 the control unit 16 acquires the area in the RGB color space F enclosed by the second grid points J as the color calibration space E. In S14 the control unit 16 acquires the image colors Q, which are the colors used in the printing target image C, on the basis of the image data. In S15 the control unit 16 determines whether the color indicated by one image color Q is included in the color calibration space E.

When the image color Q is included in the color calibration space E (S15: YES), in S16 the control unit 16 sets this image color Q as a target color for color calibration and performs a storage operation to store the target color in the storage unit 15. Subsequently, the control unit 16 advances to S17 described below. However, when the image color Q is not included in the color calibration space E (S15: NO), the control unit 16 advances directly to S17 while leaving this image color Q as a non-target color for color calibration that will not be targeted for color calibration.

In S17 the control unit 16 determines whether the process from S15 has been completed for all image colors Q in the printing target image C. When there remain unprocessed image colors Q in the printing target image C, i.e., image colors Q that have not undergone the process from S15 (S17: NO), the control unit 16 returns to S14, acquires one of the unprocessed image colors Q, and repeats the process from S15 on this new image color Q. In this way, the process from S15 is performed sequentially on all image colors Q in the printing target image C.

Once the above process has been completed for all image colors Q in the printing target image C (S17: YES), in S18 the control unit 16 displays the printing target image C on the display unit 13 so that the target colors for color calibration are distinguishable from the non-target colors for color calibration by displaying the target colors in a manner different from the manner these target colors are displayed in the first display operation and displaying the non-target colors in the same manner as the manner these non-target colors are displayed in the first display operation. As illustrated in the example of FIG. 5A, the control unit 16 displays the target colors for color calibration in the printing target image C displayed on the display unit 13 within borders M to be distinguishable from the non-target colors displayed outside the borders M. Here, the control unit 16 may performs a third display operation to display a color space image R representing the device-independent color space on the display unit 13, as illustrated in the example of FIG. 6. The control unit 16 also displays a border M around the target colors for color calibration in this color space image R so that the target colors are distinguishable from the non-target colors outside the border M.

On the other hand, when the control unit 16 determines in S10 of FIG. 9 that there is more than one specified color D (S10: NO), the control unit 16 processes one of the specified colors D at a time. That is, in S19 of FIG. 10 the control unit 16 selects one unprocessed specified color D from among the plurality of specified colors D and performs the process from S20 on the selected specified color D.

The process in S20 through S24 of FIG. 10 is identical to that in S11 through S15 of FIG. 9. Therefore, in S20 the control unit 16 acquires each of the grid points in the RGB color space F that constitute vertices of the first polyhedron G enclosing the specified color D as first grid points H. In S21 the control unit 16 acquires the grid points that, together with the first grid points H, constitutes the vertices of the second polyhedra I as second grid points J. In S22 the control unit 16 acquires the area enclosed by the second grid points J as the color calibration space E. In S23 the control unit 16 acquires the image colors Q in the printing target image C on the basis of the image data. In S24 the control unit 16 determines whether each image color Q is included in the color calibration space E.

Here, when an image color Q is not included in the color calibration space E (S24: NO), the control unit 16 advances to S27 since this image color Q is a non-target color for color calibration. On the other hand, when the image color Q is included in the color calibration space E (S24: YES), in S25 the control unit 16 sets the image color Q as a target color for color calibration and performs a determination operation to determine whether this target color has already been stored in the storage unit 15.

In other words, when a plurality of specified colors D has been inputted (S10: YES), a target color set for the currently-selected specified color D may have already been stored in the storage unit 15 as a target color set for the previously-selected specified color D. Therefore, when a plurality of specified colors D has been inputted through the input unit 14, in the second display operation the control unit 16 performs the determination operation in S25 to determine whether each target color in the color calibration space E set for the specified color D selected in S19 has already been stored in the storage unit 15.

When this target color has not yet been stored in the storage unit 15 (S25: NO), in S26 the control unit 16 stores the target color in the storage unit 15. That is, in S26 the control unit 16 performs the storage operation to store a target color in the storage unit 15 after determining in the determination operation that the target color has not yet been stored in the storage unit 15. On the other hand, when the target color has already been stored in the storage unit 15 (S25: YES), the control unit 16 advances to S27.

In S27 the control unit 16 determines whether the process beginning from S24 based on the specified color D selected in S19 has been performed for all image colors Q in the printing target image C. The control unit 16 returns to S23 when determining that any of the image colors Q in the printing target image C have not yet undergone the process from S24 based on the specified color D selected in S19 (S27: NO). Thus, in S23 the control unit 16 acquires one of the unprocessed image colors Q and repeats the process from S24 on this image color Q. In this way, the process from S24 is sequentially performed on all image colors Q in the printing target image C.

Once the process based on the specified color D selected in S19 has been performed for all image colors Q in the printing target image C (S27: YES), in S28 the control unit 16 performs an individual display operation. The individual display operation is performed when a plurality of specified colors D has been inputted through the input unit 14. Specifically, each time a specified color D is selected in S19 of the second display operation, in the individual display operation the control unit 16 displays the target colors or non-target colors set for the selected specified color D on the display unit 13 in a manner different from the manner in which they are displayed in the first display operation. In this way, target colors for color calibration are displayed to be distinguishable from non-target colors for color calibration. The control unit 16 may also perform the third display operation to display a color space image R representing the device-independent color space on the display unit 13 and to display the target colors set for the selected specified color D in this color space image R in a manner distinguishable from the non-target colors. The individual display operation performed in S28 is an example of the claimed fourth display operation.

In S29 the control unit 16 determines whether the process from S19 has been performed for all specified colors D acquired in S3. If any of the specified colors D acquired in S3 have not yet undergone the process from S19 (S29: NO), the control unit 16 returns to S19. In S19 the control unit 16 selects one of the unprocessed specified colors D and repeats the process from S20 on this specified color D. Hence, the control unit 16 performs the determination operation in S25 for each target color in the color calibration space E set for the newly-selected specified color D. In this way, the control unit 16 performs the process from S19 sequentially for all specified colors D.

For example, when the specified color D selected the first time the process of S19 is performed is the blue color of the hair clip K illustrated in the example of FIG. 3, the blue color included in the color calibration space E based on this specified color D and its approximate colors are set as target colors for color calibration. In this case, in the individual display operation of S28 the control unit 16 displays borders M in the printing target image C displayed on the display unit 13 around the areas of the hair clip K and brooch L containing these target colors to make the target colors distinguishable from the non-target colors, as illustrated in the example of FIG. 5A.

Figure 5B:
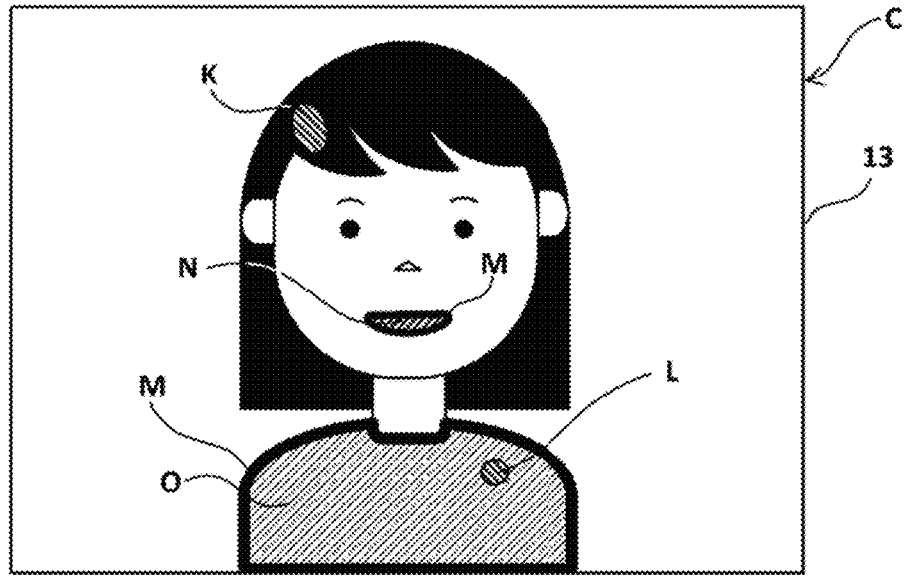
FIG. 5B is an explanatory diagram illustrating the display unit on which the printing target image is displayed so that colors targeted for color calibration set on the basis of a red specified color are distinguishable from colors not targeted for color calibration in the printing target image.
Figure 5C:
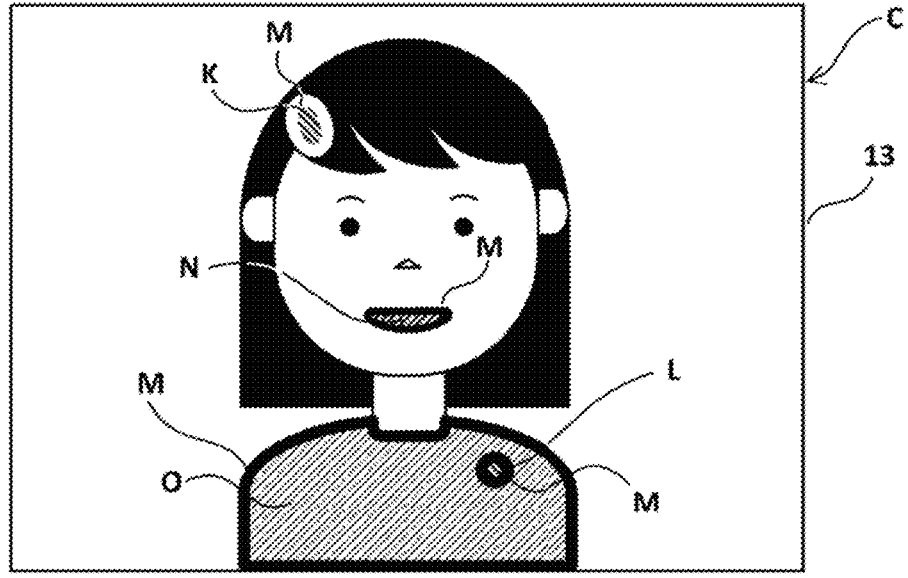
FIG. 5C is an explanatory diagram illustrating the display unit on which the printing target image is displayed so that colors targeted for color calibration set on the basis of the blue specified color and the red specified color are distinguishable from color not targeted for color calibration on the printing target image.

Furthermore, when the specified color D selected the second time the process of S19 is performed is the red color of a mouth N illustrated in the example of FIG. 3, the control unit 16 sets the red color included in the color calibration space E based on the specified color D and its approximate colors as the target colors for color calibration. In this example, a shirt O, in addition to the mouth N, contains these target colors for color calibration, as illustrated in the example of FIG. 5B. Accordingly, in the individual display operation of S28 the control unit 16 displays borders M in the printing target image C displayed on the display unit 13 around the areas of the mouth N and the shirt O containing these target colors so that the target colors are distinguishable from the non-target colors.

Once the above process has been completed for all specified colors D acquired in S3 of FIG. 8 (S29: YES), in S30 the control unit 16 performs an overall display operation. In other words, the overall display operation is performed after all specified colors D specified by the user have been selected and subjected to the process in S20 through S28. In the overall display operation, the control unit 16 displays the target colors or non-target colors set for all specified colors D on the display unit 13 in a manner different from the manner in which the target colors or non-target colors are displayed in the first display operation. Thus, the target colors for color calibration are displayed in a manner distinguishable from the non-target colors. For example, when both the blue color of the hair clip K and the red color of the mouth N in the example of FIG. 3 has been specified as specified colors D, the areas in the hair clip K and brooch L having target colors set for the blue specified color D and the areas in the mouth N and shirt O having target colors set for the red specified color D are displayed surrounded by borders M on the display unit 13 so that these target colors are distinguishable from the non-target colors. The control unit 16 may also execute the third display operation after all specified colors D have been selected and processed. In the third display operation, the control unit 16 displays a color space image R representing the device-independent color space on the display unit 13 and displays the target colors set for all specified colors D in this color space image R so that the target colors are distinguishable from the non-target colors. The overall display operation performed in S30 is an example of the claimed fifth display operation.

By displaying target colors set for individual specified colors D individually for each specified color D in individual display operation, the user can easily identify individual sets of target colors. Furthermore, by displaying target colors set for all specified colors D together in the overall display operation, the user can easily identify all sets of target colors.

After displaying target colors for color calibration in S18 of FIG. 9 or S30 of FIG. 10, in S5 of the process in FIG. 8 the control unit 16 performs a printing operation to print the patch chart P on print media A. In the printing operation, the control unit 16 acquires the first colors of the first patches P1 and the second colors of the second patches P2 from the storage unit 15. Next, the control unit 16 generates image data for a patch chart P on the basis of the first colors and second colors and prints the patch chart P on print media A based on this image data.

In S6 the control unit 16 performs a color measuring operation to measure the colors of the first patches P1 and second patches P2 printed on the print media A with the color measuring unit 24. The control unit 16 acquires colorimetric values for the first patches P1 and second patches P2 through the color measuring operation, associates the Lab values of the colorimetric values for the first patches P1 with the RGB values of the first colors, associates the Lab values of the colorimetric values for the second patches P2 with the RGB values of the second colors, and stores these associations in the storage unit 15 as patch information.

In S7 the control unit 16 performs a color calibration operation to calibrate the conversion table on the basis of the colors measured in the color measuring operation. In this color calibration operation, the control unit 16 calibrates the conversion table on the basis of the patch information and stores the calibrated conversion table in the storage unit 15. Next, the control unit 16 uses the calibrated conversion table to convert the image data representing the printing target image C and prints the printing target image C on print media A based on the converted image data. Here, the input values of the conversion table include the color values of the first grid points H in the color calibration space E based on the specified color D, and the output values corresponding to these input values are calibrated on the basis of the patch information. Hence, target colors included in the color calibration space E are corrected in the printed printing target image C on the basis of the specified color D.

In the embodiment described above, the patch chart P has first patches P1 and second patches P2. However, the patch chart P may simply have second patches P2 and not first patches P1. In this case, the control unit 16 may print the second patches P2 in the printing operation, measure the colors of the second patches P2 with the color measuring unit 24 in the color measuring operation, and calibrate the conversion table in the color calibration operation on the basis of the measured colors.

The printing apparatus 10 in the embodiment described above may be a printing system provided with the image processing device 12, and an output device that includes the printing engine 11. In this case, in addition to the storage unit 15 and control unit 16 of the image processing device 12, the printing system may be provided with a storage unit and a control unit in the output device. Therefore, the control unit 16 of the image processing device 12 and the control unit of the output device may control components of the printing system in cooperation with each other. Further, the storage unit 15 of the image processing device 12 and the storage unit of the output device may both store information in the printing system.

VARIATIONS OF THE EMBODIMENT

In the embodiment described above, the storage unit 15 has RAM and ROM, the RAM temporarily stores target colors for color calibration, and the ROM stores the conversion table. However, the present disclosure is not limited to this configuration. For example, the RAM may store both the target colors for color calibration and the conversion table. Alternatively, the storage unit 15 may possess E2PROM, and the E2PROM may stores the target colors for color calibration and the conversion table. The storage unit 15 may also possess NVRAM, and the NVRAM may stores the target colors for color calibration and the conversion table.

In the third display operation of the embodiment described above, the control unit 16 adds a border M around the target colors in the image R of the color space displayed on the display unit 13 so that the target colors within the border M are distinguishable from non-target colors outside the border M, as illustrated in the example of FIG. 6, but the method of distinguishing colors in the display is not limited to this method. For example, in the third display operation the control unit 16 may differentiate target colors from non-target colors in the display without using borders M but rather by maintaining the appearance of the target colors the same as in the first display operation while changing the appearance of the non-target colors from their appearance in the first display operation. For example, in the third display operation the control unit 16 may adjust non-target colors closer to white by reducing the density values of the non-target colors from those used in the first display operation, thereby making the target colors stand out. Alternatively, the control unit 16 may adjust non-target colors closer to black in the third display operation by increasing the density values of the non-target values from those used in the first display operation, thereby making the target colors stand out. Alternatively, the control unit 16 may make the target colors stand out by displaying only the target colors for color calibration in the third display operation without displaying the non-target colors.

While an inkjet printer serves as an example of the printing apparatus 10 in the embodiment described above, the printing apparatus 10 may be another printer, such as a laser printer or a thermal printer. A laser printer is provided with a printing engine. The printing engine of a laser printer includes an image carrying body such as a photosensitive drum or a photosensitive belt, a charging unit that charges the image carrying body through contact or non-contact, an exposure unit that forms an electrostatic latent image on the charged image carrying body using a laser semiconductor or the like (known as "exposure"), a toner cartridge or developing cartridge that supplies toner to the image carrying body on which an electrostatic latent image has been formed, a transfer unit such as a transfer roller or a transfer belt that transfers the developed toner image from the image carrying body directly to a print medium, and a fixing unit such as a fixing roller or a fixing belt that thermally fixes the toner transferred onto the print medium. The laser printer is not limited to the direct tandem laser printer described above but may be an intermediate transfer laser printer. An intermediate transfer laser printer first transfers the developed toner image from the image carrying body onto an intermediate transfer belt before using the transfer unit to transfer the toner image from the intermediate transfer belt onto the print medium. A thermal printer is also provided with a printing engine. The printing engine of a thermal printer includes a thermal head, and an ink ribbon. The thermal head contacts the ink ribbon and transfers ink in the ink ribbon onto a print medium by generating heat in selective heating elements.

While the printing apparatus 10 is a serial printer in the embodiment described above, the printing apparatus 10 may be a line printer instead. In this case, the printing apparatus 10 does not include the moving unit 40, and the length of the print head 20 in the left-right direction is longer than the length of the print medium A in the same direction.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

<Industrial Applicability>

The present disclosure is useful as an image processing device, a method of controlling the image processing device, a non-transitory computer-readable storage medium storing a set of computer-readable instructions for controlling the image processing device, and a printing apparatus that enables the user to easily identify the range of colors targeted for color calibration set for a specified color in a printing target image.

What is claimed is:

1. An image processing device comprising:
   a display configured to display a printing target image;
   an input unit configured to input a specified color specified from among a plurality of image colors used in the printing target image displayed on the display;
   a storage unit; and
   a controller,
   wherein the storage unit is configured to store a conversion table mapping a plurality of input values to respective ones of a plurality of output values, the plurality of input values corresponding to respective ones of a plurality of grid points in a predetermined color space, and
   wherein the controller is configured to perform:
      a first display operation to display the printing target image on the display; and
      in response to the input unit inputting the specified color in the printing target image displayed on the display in the first display operation, a second display operation to display at least one of a target color and a non-target color in a manner different from the at least one of the target color and the non-target color in the printing target image displayed by the first display operation,
   wherein the target color is a color targeted for color calibration and is included in a color calibration space in the predetermined color space, and the non-target color is a color not targeted for the color calibration and is not included in the color calibration space, the color calibration space being defined by a predetermined number of first grid points and a plurality of second grid points,
   wherein the first grid points are included in the plurality of grid points in the predetermined color space and define a first polyhedron, the first polyhedron being a polyhedron with a minimum volume enclosing the specified color and having the first grid points as vertices,
   wherein the second grid points are included in the plurality of grid points in the predetermined color space and define a plurality of second polyhedra together with the first grid points, each of the second polyhedra being a polyhedron with the minimum volume having a predetermined number of specific grid points as vertices, the predetermined number of specific grid points being included in the first grid points and the second grid points and including at least one first grid point and at least one second grid point adjacent to one of the at least one first grid point, no grid point being positioned between each of the at least one second grid point and the one of the at least one first grid point, and
   wherein the color calibration space is a space enclosed by the second grid points.

2. The image processing device according to claim 1,
   wherein in the second display operation, the controller displays the at least one of the target color and the non-target color on the printing target image in a manner different from the at least one of the target color and the non-target color in the printing target image displayed by the first display operation.

3. The image processing device according to claim 1,
   wherein the controller is configured to further perform:

a third display operation to display the target color in a manner distinguishable from the non-target color within a color space image displayed on the display, the color space image representing the predetermined color space.

4. The image processing device according to claim 1, wherein when the input unit inputs a plurality of specified colors, in the second display operation the controller performs:
 a fourth display operation for each of the specified colors to display at least one of the target color and the non-target color set for the each of the specified colors in a manner different from the at least one of the target color and the non-target color set for the each of the specified colors in the printing target image displayed by the first display operation; and
 a fifth display operation to display at least one of the target color and the non-target color set for all the specified colors in a manner different from the at least one of the target color and the non-target color set for all the specified colors in the printing target image displayed by the first display operation.

5. The image processing device according to claim 1, wherein when the input unit inputs a plurality of specified colors, in the second display operation the controller performs:
 a determination operation for each of the specified colors to determine whether the target color set for the each of the specified colors has been stored in the storage unit; and
 in response to determining in the determination operation that the target color set for the each of the specified colors has not been stored in the storage unit, a storage operation for the each of the specified colors to store the target color set for the each of the specified colors in the storage unit.

6. The image processing device according to claim 5, wherein in response to determining in the determination operation that the target color set for the each of the specified colors has been stored in the storage unit, the controller skips the storage operation for the each of the specified colors.

7. A printing apparatus comprising:
 the image processing device according to claim 1; and
 a printing engine configured to print a patch chart on a print medium,
 wherein the patch chart includes a first patch for a predetermined color and a second patch for the specified color,
 wherein the patch chart has a first patch area and a second patch area, the first patch being arranged in the first patch area, the second patch being arranged in the second patch area, and
 wherein the controller is configured to further perform:
  a printing operation to print the patch chart on the print medium with the printing engine.

8. The printing apparatus according to claim 7, further comprising:
 a color measuring unit configured to measure a color of the patch chart,
 wherein the controller is configured to further perform:
  a color measuring operation to measure colors of the first patch and the second patch printed on the print medium with the color measuring unit; and
  a color calibration operation to calibrate the conversion table on the basis of the colors measured in the color measuring operation.

9. A method of controlling an image processing device, the image processing device includes: a display configured to display a printing target image; an input unit configured to input a specified color specified from among a plurality of image colors used in the printing target image displayed on the display; and a storage unit configured to store a conversion table mapping a plurality of input values to respective ones of a plurality of output values, the plurality of input values corresponding to respective ones of a plurality of grid points in a predetermined color space, the method comprising:
 a first display operation to display the printing target image on the display; and
 in response to the input unit inputting the specified color in the printing target image displayed on the display in the first display operation, a second display operation to display at least one of a target color and a non-target color in a manner different from the at least one of the target color and the non-target color in the printing target image displayed by the first display operation,
 wherein the target color is a color targeted for color calibration and is included in a color calibration space in the predetermined color space, and the non-target color is a color not targeted for the color calibration and is not included in the color calibration space, the color calibration space being defined by a predetermined number of first grid points and a plurality of second grid points,
 wherein the first grid points are included in the plurality of grid points in the predetermined color space and define a first polyhedron, the first polyhedron being a polyhedron with a minimum volume enclosing the specified color and having the first grid points as vertices,
 wherein the second grid points are included in the plurality of grid points in the predetermined color space and define a plurality of second polyhedra together with the first grid points, each of the second polyhedra being a polyhedron with the minimum volume having a predetermined number of specific grid points as vertices, the predetermined number of specific grid points being included in the first grid points and the second grid points and including at least one first grid point and at least one second grid point adjacent to one of the at least one first grid point, no grid point being positioned between each of the at least one second grid point and the one of the at least one first grid point, and
 wherein the color calibration space is a space enclosed by the second grid points.

10. A non-transitory computer-readable storage medium storing a set of computer-readable instructions for controlling an image processing device, the image processing device includes: a display configured to display a printing target image; an input unit configured to input a specified color specified from among a plurality of image colors used in the printing target image displayed on the display; and a storage unit configured to store a conversion table mapping a plurality of input values to respective ones of a plurality of output values, the plurality of input values corresponding to respective ones of a plurality of grid points in a predetermined color space, the set of computer-readable instructions comprising:
 a first display operation to display the printing target image on the display; and
 in response to the input unit inputting the specified color in the printing target image displayed on the display in the first display operation, a second display operation to display at least one of a target color and a non-target color in a manner different from the at least one of the target color and the non-target color in the printing target image displayed by the first display operation, wherein the target color is a color targeted for color calibration and is included in a color calibration space in the predetermined color space, and the non-target color is a color not targeted for the color calibration and is not included in the color calibration space, the color calibration space being defined by a predetermined number of first grid points and a plurality of second grid points, wherein the first grid points are included in the plurality of grid points in the predetermined color space and define a first polyhedron, the first polyhedron being a polyhedron with a minimum volume enclosing the specified color and having the first grid points as vertices, wherein the second grid points are included in the plurality of grid points in the predetermined color space and define a plurality of second polyhedra together with the first grid points, each of the second polyhedra being a polyhedron with the minimum volume having a predetermined number of specific grid points as vertices, the predetermined number of specific grid points being included in the first grid points and the second grid points and including at least one first grid point and at least one second grid point adjacent to one of the at least one first grid point, no grid point being positioned between each of the at least one second grid point and the one of the at least one first grid point, and wherein the color calibration space is a space enclosed by the second grid points.

* * * * *